United States Patent [19]

Sturza et al.

[11] Patent Number: 4,862,178
[45] Date of Patent: Aug. 29, 1989

[54] DIGITAL SYSTEM FOR CODELESS PHASE MEASUREMENT

[75] Inventors: Mark A. Sturza, Woodland Hills, Calif.; Alison K. Brown, Monument, Colo.

[73] Assignee: Litton Systems, Inc., Beverly Hills, Calif.

[21] Appl. No.: 211,814

[22] Filed: Jun. 27, 1988

[51] Int. Cl.$^4$ ............................................ H04B 7/185
[52] U.S. Cl. ..................................... 342/357; 342/417; 375/1
[58] Field of Search ................ 375/1; 342/357, 417, 342/458

[56] References Cited

U.S. PATENT DOCUMENTS

| | | | |
|---|---|---|---|
| 4,646,096 | 2/1987 | Brown | 342/357 |
| 4,667,203 | 5/1987 | Counselmann, III | 342/357 |
| 4,754,283 | 6/1988 | Fowler | 375/1 |
| 4,754,465 | 6/1988 | Trimble | 375/1 |
| 4,785,463 | 11/1988 | Janc et al. | 375/1 |
| 4,797,677 | 1/1989 | MacDoran et al. | 342/357 |
| 4,800,577 | 1/1989 | Tachita et al. | 342/417 |
| 4,807,256 | 2/1989 | Holmes et al. | 342/357 |
| 4,809,005 | 2/1989 | Counselmann, III | 342/357 |
| 4,812,991 | 3/1989 | Hatch | 342/357 |
| 4,817,113 | 3/1989 | Lundquist et al. | 375/1 |

Primary Examiner—Salvatore Cangialosi
Attorney, Agent, or Firm—Elliott N. Kramsky

[57] ABSTRACT

A codeless digital method and apparatus for obtaining measured phase from a plurality of L2 signal transmissions. An intermediate frequency signal is derived by mixing the L2 transmissions with a local oscillator. That signal is hardlimited and employed to terminate the count of a divide-by-32 counter that is clocked by the local oscillator signal and initiated by a signal in synchronization therewith whose frequency is a fraction of the local oscillator. The state of the counter is applied to a four bit latch. The state of the latch, which effectively discards the most significant bit of the count, provides the measured phase of the L2 transmissions from which position can be obtained by reference to the satellite phase and delta range values derived therefrom.

14 Claims, 3 Drawing Sheets

DIGITAL SYSTEM FOR CODELESS PHASE MEASUREMENT

BACKGROUND

1. Field of the Invention

The present invention relates to apparatus and methods for measuring the baseline vectors between a pair of points, such as survey marks, on earth by radio interferometry from information contained within the L1 and L2 transmissions from satellite transmitters of the G.P.S. (Global Positioning System) constellation. More particularly, this invention pertains to a digital system for use in determining the signal phase of satellite transmissions that does not require a priori knowledge of the coding modulation of the satellite transmissions.

2. Description of the Prior Art

The use of pseudo random bit sequences to modulate free space signals has acquired significance in the communication arts with many important applications, both military and civilian. By utilizing such a sequence, often referred to as a pseudo-noise code (PN-code), one may modulate a sinusoidal carrier in such a way as to create a signal of the direct sequence spread spectrum type. In such a signal, more bandwidth is occupied than is required for information transmission. As such, one may attain a number of advantageous characteristics including (1) hiding of signal, (2) inherent anti-jam performance resulting from the spreading of signal power, (3) transmission of ranging information, (4) lessened sensitivity to signal path anomalies and (5) code division multiple access (CDMA) allowing the transmission of many signals in the same frequency band without interference.

The above-described characteristics of direct sequence spread spectrum signal transmissions have proven advantageous in battlefield environments, oil exploration and satellite-aided radio navigation. A prominent application is found in the Global Positioning System ("GPS"), a world-wide network of earth satellite-transmitters that will allow users to fix or determine their locations with respect to known satellite locations. Each of such satellites will transmit both an L1 signal at a nominal (suppressed) carrier frequency of 1575.42 MHz modulated with both an identifying C/A (coarse acquisition) coded pseudo-noise sequence and an identifying P (precision) coded sequence and an L2 signal having a nominal (suppressed) carrier frequency of 1227.60 MHz modulated with an identifying P (precision) coded sequence that is assigned to the satellite. The precise location of a GPS receiver is determined from the known locations of the satellite transmitters by well known techniques of trilateration.

Techniques of determining relative positions of different sites, one with respect to another, from measurements of the phase or the group delay differences between radio signals received simultaneously at those sites are also known in the art and are collectively referred to as techniques of geodesy by radio interferometry. The antennas at the separate sites are considered to form an interferometer, and the relative position vector that extends from one antenna to the other is called the baseline vector of the interferometer. The baseline, or relative-position, vector between two antennas can be determined usually with less uncertainty that the position of either individual antenna can be, because many potential sources of error tend to affect the measurement at both antennas nearly equally, and therefore tend to cancel when differences are taken between the two antennas. The technique of geodesy by microwave radio interferometry is known to provide an unmatched combination of accuracy, speed, and range for the determination of relative-position or interferometer "baseline" vectors. Such a determination may be based upon measurements of either the group-delay difference, or the phase difference, or of both differences between the signals received at the two ends of the baseline vector. Phase measurements are inherently more accurate than group delay measurements, but the interpretation of phase measurements is more complicated due to their intrinsic, integer-cycle ambiguity.

In the prior art, the information for determining baseline vectors from G.P.S. satellite transmissions required knowledge of the coding that modulated the transmission. While the C/A codes will be generally available to the public, P codes will be strictly limited to military applications and, thus, this technique limits the public to L1 transmissions.

A number of "codeless" systems have been developed to alleviate the requirement of having to know the PN-code to obtain information from the satellite signal. Among such systems are those described in U.S. patent Ser. No. 4,667,203 of Charles C. Counselman, III issued May 19, 1987 entitled "Method and System For Determining Position Using Signals From Satellites". That patent discloses a system for determining an earth baseline vector by locating G.P.S. receivers at the end points of such baseline. The system described in that patent relies upon predictions of the doppler shifts of the nominal carriers from multiple satellites, rather than knowledge of the codes modulating such transmissions, to calculate the baseline vector from the L2 satellite transmissions. While the system disclosed in that patent represents an improvement over systems requiring knowledge of the coded modulation of satellite transmissions, the disclosed system is implemented in analog circuitry and therefore employs elements that are inherently more costly, less reliable, more sensitive to temperature change, consume more power and space than digital circuit elements.

SUMMARY OF THE INVENTION

The foregoing and other shortcomings of the prior art are addressed by the present invention that provides, in a first aspect, an improvement in the a method for determining baseline vectors from information contained in the L2 P-coded signals from a plurality of G.P.S. transmitters of the type wherein the transmissions are detected by receivers located at a each end of the baseline and the transmitters are identified by comparing the measured phase of the received transmissions with predicted values thereof so that apriori knowledge of the signal modulating codes is not required. The improvement comprises a method for deriving the measured phase value of the multiple satellite transmissions. The method includes the mixing of the L2 signals with a local oscillator to provide an intermediate frequency signal. The local oscillator clocks a counter. The counter is started by a signal that is synchronized with, and whose frequency is a fraction of, the local oscillator. The intermediate frequency signal is utilized to stop the counter. After the counter has been stopped by the intermediate frequency signal, the most significant bit of the count is discarded, thereby providing the value of the measured phase.

In another aspect, the present invention provides apparatus for codeless digital detection of the measured phase of a plurality of code-modulated signals of the spread spectrum type. Such apparatus includes means for mixing the signals with a local oscillator to provide an intermediate frequency signal. A counter is provided that is clocked by the local oscillator. Means are provided for dividing the frequency of the local oscillator to produce a third signal that is synchronized with the local oscillator and has a frequency that is a fraction thereof. The third signal is applied to the counter so that the counter is initiated to begin counting in response to the third signal. Means are provided for discarding the most significant bit of the count of the counter.

The preceding and other features and advantages of the invention will become further apparent from the detailed description that follows. This description is accompanied by a set of illustrative drawing figures. Corresponding numerals of the written description and the drawing figures point to the features of the invention, like numerals referring to like features throughout.

DETAILED DESCRIPTION

Figure 1:
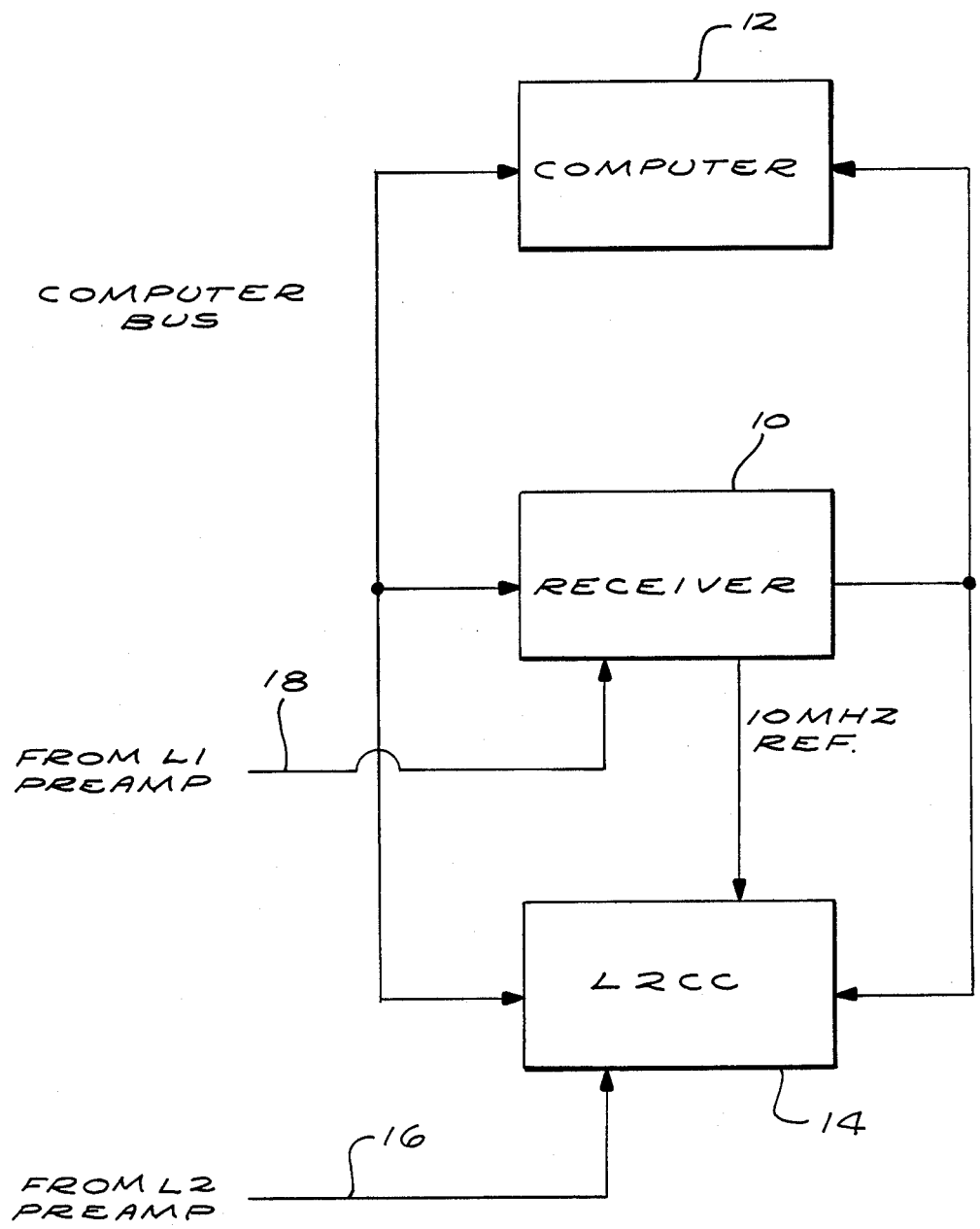
FIG. 1 is a block diagram of navigation system including an L2 Codeless Card in accordance with the invention.

FIG. 1 is a block diagram of a navigation system that includes an L2 codeless card in accordance with the invention. Such system comprises a cooperative arrangement that includes a G.P.S. receiver 10 for tracking the C/A coded L1 signals, a computer 12 and the card 14 for generating phase and Delta range measurements from the P-coded L2 signals of the G.P.S. constellation.

As will be seen, the computer 12 provides timing and control for synchronizing the operations of the L2 card 14 with those of the L1 receiver 10. The card 14 receives the L2 P-coded signals via an r.f. cable 16 after appropriate conversion of the free space transmission by means of an antenna, a bandpass filter (20 MHz bandwidth) and a low noise preamplifier (approximately 50 dB gain) for setting the system noise floor. Preferably, an approximate system noise figure of 3 dB is attained.

A cable 18 transmits similarly-conditioned L1 r.f. signals to the receiver. As is well known, the nominal (suppressed) carrier frequency of L1 signals is 1575.42 MHz while that of L2 signals is 1227.6 MHz.

Figure 2:
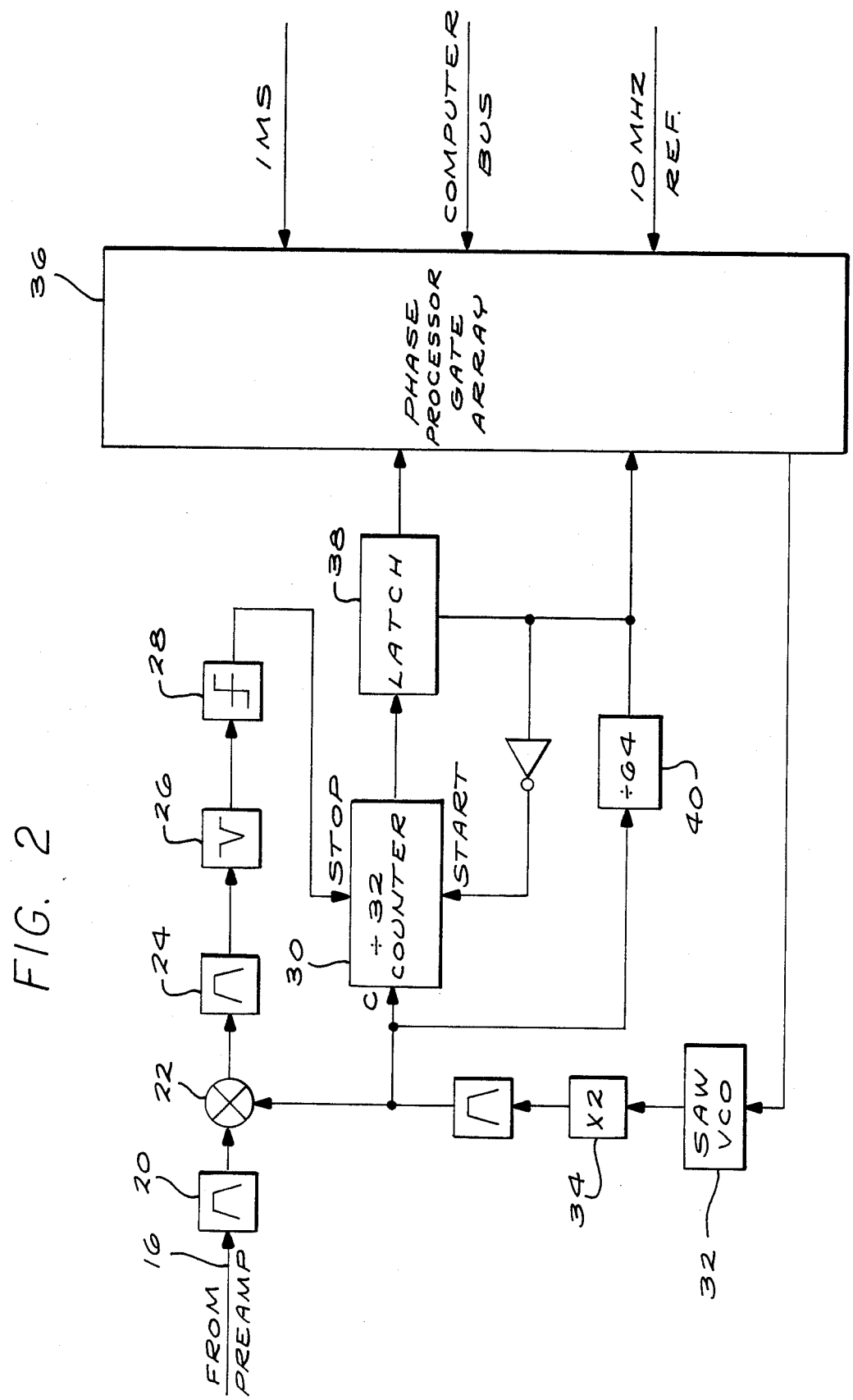
FIG. 2 is detailed block diagram of the L2 Codeless Card of the navigation system of FIG. 1.

FIG. 2 is a detailed block diagram of the L2 codeless card 14. The appropriately-conditioned L2 signals are applied to, and bandpass filtered by, an image reject filter 20. The output of the image reject filter 20 is translated to the nominal intermediate frequency (IF) value of 37.2 MHz by application to a mixer 22 that receives a 1190.4 MHz local oscillator signal. The IF signal is then applied, in turn, to a 20 MHz bandpass filter 24, to a notch filter 26 and to a limiter 28. The resulting signal is then applied to the STOP terminal of a divide-by-32 counter 30 which, as will be seen, provides a phase sampling function.

The counter 30 is clocked by the 1190.4 MHz local oscillator signal. This signal is generated by applying the output of a 595.2 MHz SAW voltage controlled oscillator 32 to a doubler 34. The signal thus derived is bandpass filtered to eliminate undesired frequency modes. The oscillator 32 is phase locked to a 10 MHz frequency reference provided by the L1 receiver 10. The reference signal is generated either within the receiver 10 (which has high internal stability) or by an external 10 MHz frequency reference, under control of the computer 12.

As mentioned above, the output of the limiter 28 is applied to the STOP terminal of the divide-by-32 counter 30 that is clocked by the 1190.4 MHz local oscillator. An 18.6 MHz signal, formed by applying the 1190.4 MHz local oscillator signal to a divide-by-64 counter 40, is applied both to a four bit latch 38 and (after inversion) to the START terminal of the counter 30. The counter 30, in combination with the four bit latch 38, provides an arrangement for digitally sampling the phase of the hardlimited IF signal. As already mentioned, the counter 30 is initiated by the arrival of the falling edge of an 18.6 MHz pulse from the divide-by-64 counter 40. This signal is synchronized with the 1190.4 MHz clocking pulses of the local oscillator. The local oscillator signal is, as mentioned above, generated by doubling and filtering the output of the SAW VCO 32. The rising edges of the pulse outputs of the divide-by-64 counter 40 act to latch the four least significant bits of the counter 30. The counter 30 is then "stopped" by the positive-going zero crossings of the hardlimited IF signal.

A previously referenced, the oscillator 32 is phase locked to a 10 MHz reference signal from the L1 receiver 10. The arrangement for accomplishing such synchronization is disclosed at the bottom portion of FIG. 3. As shown, the nominal 18.6 MHz signal output from the divide-by-64 counter 40 is further applied to a divide-by-93 counter 58. This signal is input to an exclusive-OR gate 60. The other input to the gate 60 is a 200 kHz signal that is derived by applying the 10 MHz reference signal from the L1 receiver 10 to a divide-by-50 counter 62. The phase locked 200 kHz signal thus generated at the output of the gate 60 is then applied, as a control, to the VCO 32.

The IF signal applied to the limiter 28 is of the form:

$$s(t) = \sqrt{2P} \cos(\omega_{IF} t + \omega_d t + \theta + \pi d(t-\tau) + \pi P(t-\tau)) + n(t) \quad (1)$$

where:
P = signal power;
$\omega_{IF}$ = IF frequency (radians/second);
$\omega_d$ = Doppler frequency;
$\theta$ = carrier phase (radians);
d(t) = 50 BPS data (0 or 1);
P(t) = 10.23 P- code (0 or 1); and
n(t) = AWGN.

The measured phase sampling interval is an integer multiple of $T = 2\pi/\omega_{IF}$. As such, the five-bit state of the counter 30, when stopped by the arrival of a positive-going zero crossing of the hardlimited IF signal is:

$$(\omega_d n T + \theta + \pi d(t-\tau) + \pi P(t-\tau) + \phi_n) \quad (2)$$

where $\phi_n$ = phase noise component due to n(t).

The foregoing expression, of course, includes the effect of the P-coding of the GPS signal. This is removed by doubling the count of the counter 30 (such count having been stopped by the hardlimited IF signal.) As a result of such doubling, the value of the IF signal s(t) is squared and an expression or value that is independent of the coding of s(t) is obtained.

The doubling of the value or count that is generated is accomplished by entering only the four LSB's of the count generated within the counter 30 during the ("START" to "STOP") interval into the latch 38 and "discarding" the value of the most significant bit. As a result, the following value is entered into the latch 38 during each phase sampling period:

$$(2\omega_d nT + 2\theta + 2\phi_n) \mod 2\pi. \quad (3)$$

The above expression represents the value of the measured phase of the IF signal and is independent of signal coding (c.f. equations 1 and 2).

A measured phase value as above-determined is entered into the latch 38 at the end of each phase sampling period, terminated by the arrival of a positive-going zero crossing of the hardlimited IF STOP signal at the counter 30. The latched measured IF phase value is thereupon applied to the phase processor gate array 36 at a rate of 18.6 MHz by the arrival of a downgoing edge of a pulse from the divide-by-64 counter 40.

The measured phase value, in combination with a phase tracking method and apparatus described below, is utilized by the receiver to generate L2 doppler phase and delta range for a plurality of satellite transmitters without knowledge of the modulating coding of the L2 signals. Thus, the invention permits one to determine position codelessly with radio geodesy by utilizing the measured phase as determined above in combination with signal processing and computations described below.

Figure 3:
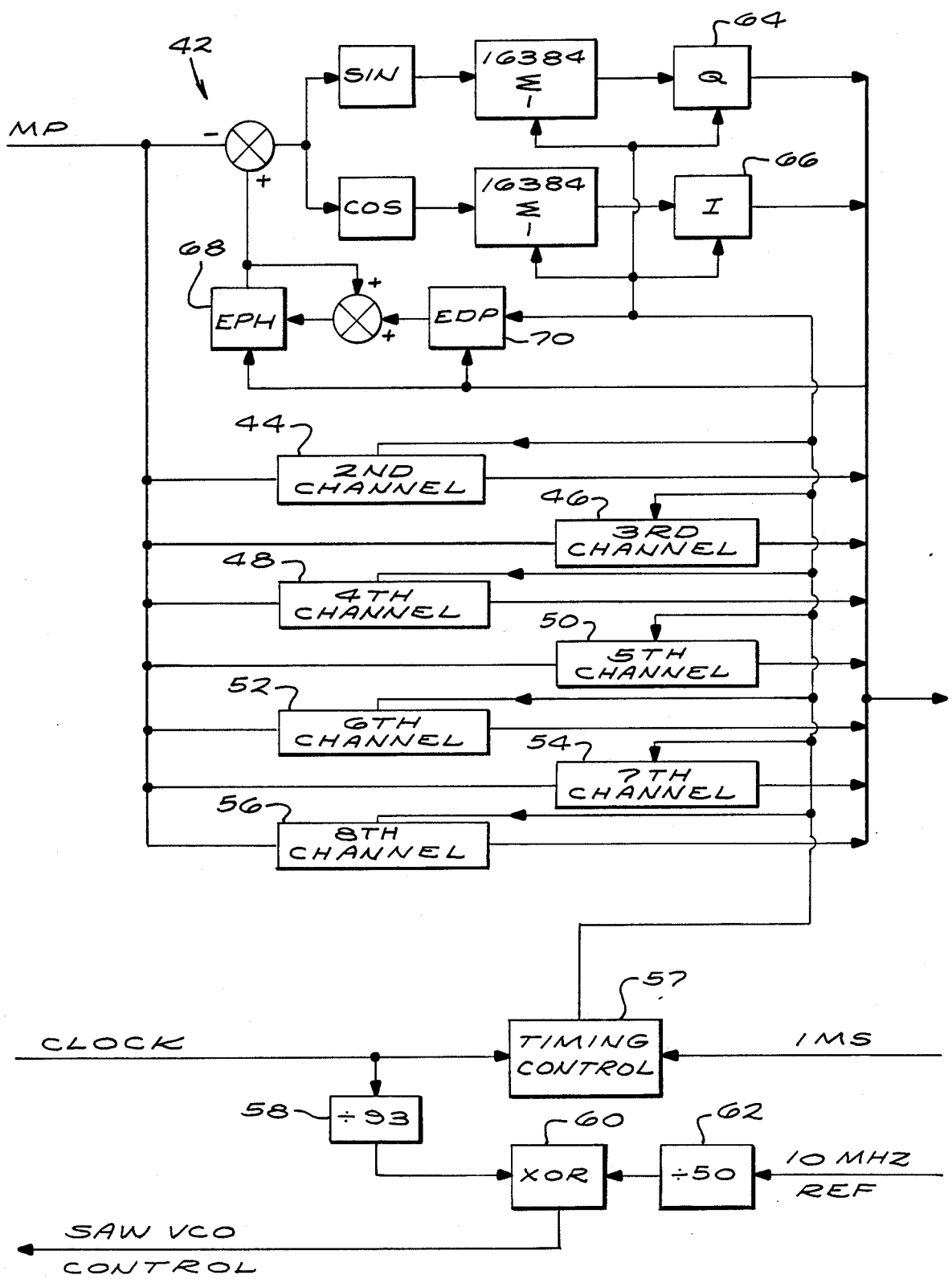
FIG. 3 is a block diagram of the phase processor gate array of the L2 Codeless Card of the invention.

FIG. 3 is a circuit schematic diagram of the phase processor gate array 36. As shown, the array 36 includes eight independent channels 42, 44, 46, 48, 50, 52, 54 and 56, each of which is dedicated to a single L2 P-coded satellite signal. Each channel of the array 36, under a central timing control unit 57, processes the measured phase value to track the L2 signal phase of a predetermined satellite transmitter. The method and the apparatus employed for each of the channels is substantially in accordance with that disclosed in U.S. patent Ser. No. 4,584,652 of Sturza et al. entitled "Apparatus and Method For Determining In-phase and Quadrature-phase Components", the teachings of which are hereby incorporated by reference. The title to that invention and patent are held by the assignee herein.

The channels 42 through 56 are arranged to provide values of phase error (measured phase difference with an estimated phase value) associated with the signals transmitted from predetermined satellite transmitters. The estimated phase value will differ from channel to channel in accordance with the identity of the transmitting satellite whose signal is being tracked by that channel. Referring now to the representative channel 42, the values generated therein and provided at the Quadrature-phase ("Q") register 64 and at the In-phase ("I") register 66 are summed in the computer 12 to reduce the prediction bandwidths of estimated phase and estimated delta phase values that the computer 12 provides to an estimated phase register 68 and to an estimated delta phase register 70. The phase error values are transformed through sine and cosine tables to form I and Q samples in accordance with the teaching of U.S. patent Ser. No. 4,584,652. Initial phase and estimated delta phase values, reflecting estimates of the distances between the location and the various known satellite transmitter locations, are supplied to the computer 12 by the receiver 10 at 1 kHz. The I and Q values are transferred to the computer 12 at 1 kHz and updated, at approximately 390 kHz, by adding estimated delta phases as taught by the referenced patent. Thus, the receiver utilizes the measured phase value to track and determine doppler phase for a plurality of G.P.S. satellites.

The computer 12 sums the I and Q sample pairs for each of the channels to reduce the predetection bandwidth (e.g. to 10 Hz). Thus, $$ISUM^k = \sum_{i=1}^{\infty} I_i^k; \quad k = 1 \text{ to } 8$$

$$QSUM^k = \sum_{k=1}^{\infty} Q_i^k; \quad k = 1 \text{ to } 8.$$

The sums are processed through a smoothing filter within the computer 12 of 2 Hz loop noise bandwidth (assuring that phase samples spaced one second apart have uncorrelated noise) to estimate signal-to-noise ratio (SNR) and to detect phase lock. The tight loop noise bandwidth is attained as a consequence of the fact that the L2 doppler frequency can be estimated from the L1 doppler frequency with an accuracy of greater than 1 Hz. Thus, for each channel, $$\theta_e^k = QSUM^k$$

$$\theta_j^k = \theta_{j-1}^k + 2 * 60/77 * \omega_{L1}^k + C * \theta_e^k; \quad k = 1 \text{ to } 8$$

$$C = 4 * B_n; \quad B_n = 2 \text{Hz}$$

where $\omega_{L1}^k$ is the doppler frequency of the L1 C/A-code signal being tracked.

The value of $\theta_j^k$ at the one second epoch is the phase measurement of the L2 P-code signal of the satellite where L1 C/A-code doppler is given by $\omega_{L1}^k$. The sum formed by $$\sum_{j=1}^{10} 2 * 60/77 * \omega_{L1}^k + C * \theta_e^k$$

is the one second L2 P-code delta range

Thus it is seen that the present invention provides both a method and apparatus for the codeless determination of L2 phase and delta range by digital means. As a consequence, the inherent advantages of digital circuitry, including lower production costs, increased reliability, lower temperature sensitivity, smaller size and power consumption, are thus attained. By utilizing the teachings of the invention one can obtain measured phase by digital techniques and, from such values, usable phase and delta range information is readily obtained with existing digital processing and computation methods.

While this invention has been described with reference to a presently-preferred embodiment, it is by no means limited thereto. Rather, the scope of the present is only limited insofar as defined by the following set of claims and includes all equivalents thereof.

What is claimed is:

1. In a method for determining baseline vectors from information contained in the L1 and L2 signals from a plurality of G.P.S. transmitters of the type wherein said transmissions are detected by receivers located at each end of said baseline and said transmitters are identified by comparing the measured phase of said received transmissions with predicted values thereof whereby a priori knowledge of the singal modulating codes is not required, the improvement comprising measuring the phases of said signals by the steps of:

(a) mixing said L2 signals with a local oscillator to provide an intermediate frequency signal; and
(b) clocking a counter with said local oscillator; and
(c) starting said counter with a signal that is synchronized with and whose frequency is a fraction of said local oscillator; then
(d) stopping said counter with said intermediate frequency signal; and then
(e) discarding the most significant bit of said count.

2. A method as defined in claim 1 further including the step of hardlimiting said intermediate frequency signal.

3. A method as defined in claim 2 wherein said step of discarding said most significant bit further comprises the step of applying the count of said counter to a latch whose bit capacity is one less than the number of stages of said counter.

4. A method as defined in claim 3 further characterized in that:
(a) said counter is a divide-by-32 counter; and
(b) said latch is a four-bit latch.

5. A method as defined in claim 4 wherein the positive-going zero crossings of said hardlimited intermediate frequency signal stops said divide-by-32 counter.

6. A method as defined in claim 5 wherein the frequency of said local oscillator is sixty-four times that of the signal that is applied to start said counter.

7. A method as defined in claim 6 further characterized in that the nominal frequencies of said intermediate frequency signal is 37.2 MHz.

8. A method as defined in claim 7 wherein the frequency of said local oscillator is 1190.4 MHz.

9. Apparatus for codeless digital measurement of the phase of a code-modulated signal of the spread spectrum type comprising, in combination:
(a) means for mixing said signals with a local oscillator to provide an intermediate frequency signal;
(b) a counter, said counter being clocked by said local oscillator;
(c) means for dividing the frequency of said local oscillator to produce a third signal that is synchronized with said local oscillator and having a frequency that is a fraction of that of said local oscillator;
(d) said third signal being applied to said counter whereby the counter is initiated to begin counting in response to said third signal; and
(e) means for discarding the most significant bit of the count of said counter.

10. Apparatus as defined in claim 9 further including means for hardlimiting said intermediate frequency signal.

11. Apparatus as defined in claim 10 wherein said means for discarding said most significant bit further comprises a latch whose capacity is one less than the number of stages of said counter.

12. Apparatus as defined in claim 11 further characterized in that:
(a) said counter is a divide-by-32 counter; and
(b) said latch is a four-bit latch.

13. Apparatus as defined in claim 12 wherein the positive-going zero crossings of said hardlimited intermediate frequency signals stop said divide-by-32 counter.

14. Apparatus as defined in claim 13 wherein said means for dividing the frequency of said local oscillator is a divide-by-64 frequency divider.

* * * * *